United States Patent [19]
Eller, Jr.

[11] 3,751,818
[45] Aug. 14, 1973

[54] INSTRUMENT FOR CHECKING AND DETERMINING THE GRADE AND SLOPE OF A SURFACE

[76] Inventor: Kyle Clifton Eller, Jr., P.O. Box 868, Statesville, N.C. 28677

[22] Filed: Feb. 14, 1972

[21] Appl. No.: 226,103

[52] U.S. Cl. .................................. 33/375, 33/338
[51] Int. Cl. ............................................. G01c 9/28
[58] Field of Search ..................... 33/338, 374, 375, 33/376, 339, 343, 369

[56] References Cited
UNITED STATES PATENTS

| | | | |
|---|---|---|---|
| 947,072 | 1/1910 | Brouillard | 33/342 |
| 1,128,881 | 2/1915 | Jones | 33/375 |
| 2,149,360 | 3/1939 | Prout | 33/339 |
| 3,286,356 | 11/1966 | Johnson | 33/375 |

Primary Examiner—Louis R. Prince
Assistant Examiner—Charles E. Phillips
Attorney—Channing L. Richards, Francis M. Pinckney et al.

[57] ABSTRACT

An instrument for checking the grade and slope of a surface, such as a road bed, which includes a pair of spaced vertical stanchions interconnected by a horizontally extending cross member having a spirit level mounted thereon. One stanchion member is fixed to the cross member and the other stanchion member includes a telescopically received movable element having a manually operated screw actuator to raise and lower the movable element with respect to the cross member. A cord extends tautly between points on the fixed stanchion member and the movable element, respectively, these points being spaced equidistant from the supporting surfaces of the foot members of the fixed stanchion member and the movable element, respectively.

5 Claims, 4 Drawing Figures

PATENTED AUG 14 1973 3,751,818

INSTRUMENT FOR CHECKING AND DETERMINING THE GRADE AND SLOPE OF A SURFACE

BACKGROUND OF THE INVENTION

In the construction trades, a frequently encountered problem is that of establishing a predetermined slope and grade for a reference surface. For example, conduits must usually be laid at a particular incline to assure proper flow, and in road construction, the road bed must conform to design characteristics for both slope and grade. The problem of checking the slope and grade of a road bed is particularly significant because deviations from design requirements frequently result from improperly set grade stakes which are placed along the sides of the road bed, usually at 50-foot intervals, and these deviations may not be realized until a substantial portion of the road bed has been completed whereby it is both costly and time consuming for the construction crew to return to correct the deviation.

Instruments have been proposed heretofore for checking deviations in slope and grade, as for example in U.S. Pat. No. 3,286,356, issued Nov. 22, 1966. Such instruments generally rest at two spaced points along the reference surface and measure the slope of such surface between these two points, and the accuracy of the measurement depends to a large extent on whether the two points properly represent the slope or grade of the reference surface being checked. For example, in checking a road bed, it is entirely possible that one of the points on which the instrument rests is actually at a crown or depression in the road bed surface, and it is apparent that the reading on the instrument would not in this instance be an accurate measurement of the overall slope or grade of the road bed surface.

Heretofore, there has been no means for checking the placement of the instrument or the contour characteristics of the reference surface over which the instrument extends and, therefore, the measurements of these instruments are not always reliable.

SUMMARY OF THE INVENTION

In accordance with the present invention, an instrument is provided which quickly and accurately measures the slope or grade of a reference surface, and which includes a provision by which deviations in the contour of the reference surface over which the instrument extends can be checked simultaneously to assure the operator that the reading provided by the instrument accurately reflects the actual grade or slope of the surface.

In the disclosed embodiment of the present invention, an extended horizontal cross member is provided between two stanchion members, one of the stanchion members being fixed to the cross member and having a foot member for resting on the reference surface, and the other stanchion member having a movable element arranged for selective vertical movement with respect to the horizontal cross member and also having a foot member for resting on the reference surface at a point spaced from the first mentioned foot member. The cross member is fitted with a spirit level, or bubble gauge, which is used to indicate when the cross member is positioned horizontally, and the movable element is calibrated so that, when it is moved, its extent beneath the fixed stanchion can be readily determined so as to indicate the slope or grade of the surface on which the foot members are placed. In addition, the present invention provides a linear extensional element such as a cord or wire, which is secured to the fixed stanchion and the movable element of the other stanchion at points, respectively, thereon which are spaced equally from the supporting surfaces of the foot members thereof, and this linear extensional element extends tautly between these points to provide a straight line reference for checking the contour of the surface over which the instrument extends.

Preferably, the aforementioned movable element is telescopically carried in an outer tubular housing which is provided with an opening to expose calibrations on the movable element, and the outer tubular housing is provided with a screw element that is threadably connected to the movable element to selectively move the same when the screw element is turned as by using a crank arm.

Moreover, the instrument may be designed with calibrations which are particularly suited to measuring slope and grade on a roadbed in that it includes increments of calibration which constitute one one-hundreth of the length between the foot members of the instrument whereby each such increment represents 1 percent of grade or slope.

DESCRIPTION OF THE PREFERRED EMBODIMENT

Figure 1:
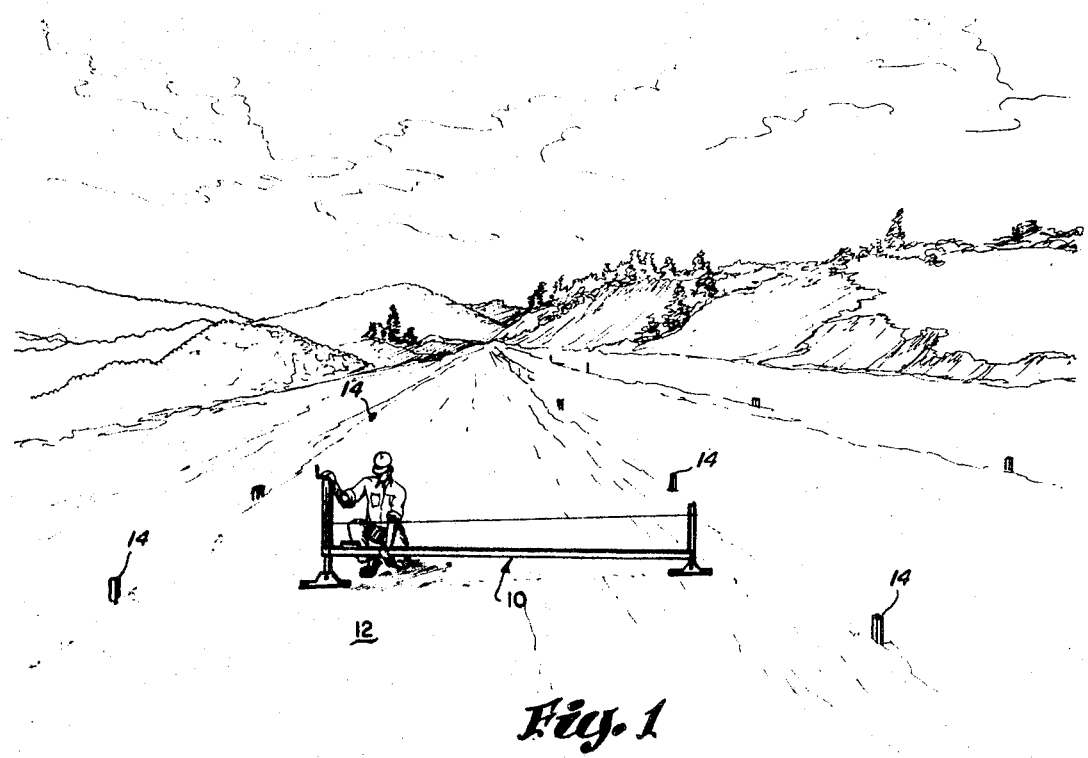
FIG. 1 is a general view illustrating a typical use of the instrument of the present invention.

Looking now in greater detail at the accompanying drawings, FIG. 1 illustrates an instrument 10 embodying the present invention and being employed in a typical field operation in which it is extremely useful; namely, measuring and checking the slope of the road bed 12. It will be noted that the rod bed 12 has a plurality of grade stakes 14 spaced therealong, the grade stakes 14 being associated in pairs located transversely across the road bed and each pair of grade stakes 14 generally being spaced at intervals of about 50 feet from the next adjacent pair. If the grade stakes 14 are properly set, the tops of each transverse pair of grade stakes will reflect the correct slope of the road bed 12 at that point, and the tops of two adjacent grade stakes 14 along one side of the road bed will reflect the grade of the road bed 12 along the extent between these two stakes.

The grade stakes 14 are set before grading operations are commenced and then appropriate grading equipment is used to prepare the road bed 12 in conformity with the settings of the grade stakes 14, both as to slope and grade. It will be apparent that little or no difficulty is encountered in preparing a proper road bed if the grade stakes 14 are properly set but, for a variety of reasons, the grade stakes 14 are sometimes improperly set initially or their original correct setting may be disturbed. If the grade stakes 14 are not properly set, the error may not be apparent to the operator of the grading equipment and, as a result, the road bed will be prepared with an improper grade and/or slope at the location of the improperly set grade stakes 14. Moreover, it is usually not until a substantial portion of the road bed has been completed that any deviation from the correct grade and/or slope is recognized, and it therefore becomes necessary to bring all the grading equipment back to the site where such deviation exists, all of which is both costly and time consuming.

The instrument 10 provides a means whereby the grade and slope of a reference surface such as a road bed 12 can be quickly, easily and accurately checked as the road bed 12 is being prepared whereby any deviations in the proper grade and slope can be corrected while the grading equipment is located at the area where such deviation occurs.

Figure 2:
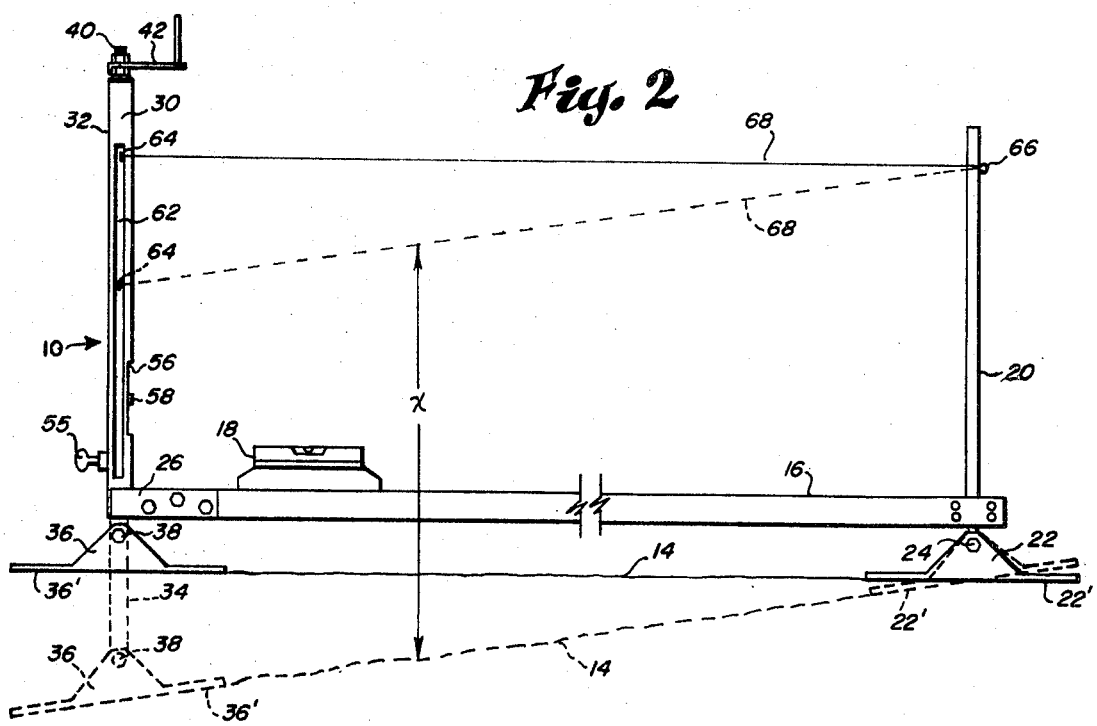
FIG. 2 is a side elevational view of the instrument of the present invention, and illustrates an adjusted position of the instrument in dotted lines.

As best seen in FIG. 2, the instrument 10 of the present invention includes a horizontally extending cross member 16 which carries a spirit level 18 thereon and which is fixed at one end thereof to a vertical stanchion 20 that has, at the lower end thereof, a foot member 22 pivotally attached thereto by a pivot bolt 24. The other end of the cross member 16 is provided with spaced attachment plates 26 and 28 (see FIG. 4) which are welded to the exterior surface of an outer tubular housing 30 forming part of an adjustable stanchion 32. The adjustable stanchion 32 also includes a movable element 34 which is telescopically received with the outer tubular housing 30 and which has a foot member 26 pivotally attached at the lower end thereof by a pivot bolt 38.

The movable element 34 is selectively adjustable within the outer housing 30 so as to be movable in a vertical direction that is substantially normal to the extent of the cross member 16. This selective adjustment is obtained by an arrangement illustrated in FIG. 3 which includes a threaded rod 40 that has a crank arm 42 secured at the upper end thereof by lock nuts 44, and that extends vertically downward through the outer tubular housing 30 and the movable element 34. The threaded rod 40 is held in place by the lock nuts 44 and a square nut 46 and roll pin 48 located beneath the upper wall 50 of the outer housing 30, and a pair of brass washers 52 are disposed on each side of the upper wall 50 to permit the threaded rod 40 to rotate easily with respect to the outer housing 30. The upper end of the movable element 34 has a nut 54 welded thereto which receives the threaded rod 40 with a threadable connection, and it will be apparent that when the rod 40 is rotated by turning the crank arm 42, the movable element 34 will move vertically along the rod 40. A thumb screw 55 is provided in one side wall of the outer tubular housing 30 for selectively locking the movable element 34 in place at any adjusted position thereof.

Figure 4:
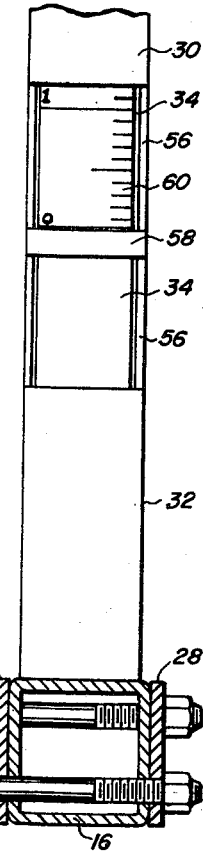
FIG. 4 is a detail view illustrating the lower portion of the stanchion shown in FIG. 3, rotated 90°.

The inwardly facing wall of the outer tubular housing 30 is formed with an opening 56 having an indicator bar 58 extending thereacross, and the corresponding wall of the movable element 34 which is exposed by the opening 56 is provided with a vertically extending calibrated scale 60 (see FIG. 4). When the movable element 34 is disposed within the outer housing 30 at a position in which the supporting surfaces 22' and 36' of the two foot members 22 and 36 are equally spaced beneath the cross member 16, the top of the indicator bar 58 will read "0" on the calibrated scale 60 as seen in FIG. 4, and as the movable element 34 is selectively moved downwardly by turning the crank arm 42, ascending numerical indicators will appear in the opening 56 at the indicator bar 58. In the preferred embodiment of the present invention, the calibrated scale 60 includes calibrated increments (i.e., the distance between "0" and "1" thereon) which is one one-hundreth of the effective length of the cross member 16. Thus, if the distance between the centers of the fixed stanchion 20 and the adjustable stanchion 32 is 10 feet, the distance between "0" and "1" on the calibrated scale is one-tenth of a foot. As will become apparent hereinafter, this calibration will permit a direct reading of the grade and/or slope of a road bed which is expressed as a percentage.

Figure 3:
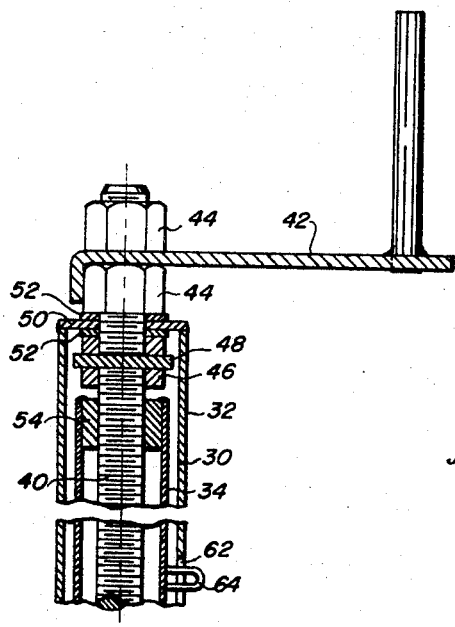
FIG. 3 is a detail view illustrating the upper portion of one of the stanchion members of the instrument shown in FIG. 2.

The outer tubular housing 30 has a slot 62 formed along the vertical extent of one side thereof, and the movable element 34 has an eyelet 64 welded thereto to extend through the slot 62 as best seen in FIGS. 2 and 3. The fixed stanchion 20 has a rod 66 welded thereto, and a linear extensional element such as a cord 68 is attached endwise to eyelet 64 and the rod 66 so as to extend tautly therebetween. The rod 66 and the eyelet 64 are located, respectively, at points on the fixed stanchion 20 and the movable element 34 which are equally spaced from the supporting surfaces 22' and 36' of respective foot members 22 and 36 attached thereto. Accordingly, when the movable element 34 is located at its previously described "0" position as shown in full lines in FIG. 2, the cord 68 will be horiontal and parallel to cross member 16. However, as the movable element 34 is lowered by turning crank arm 42, the cord 68 will assume a sloped disposition which is identical to the slope of a reference line extending beneath the foot members 22 and 36 as illustrated by the dotted lines in FIG. 2.

As has been previously discussed, a typical use for the instrument 10 of the present invention is determining and checking the grade and slope of a road bed or the like. After grading equipment has prepared a section of the road bed, the instrument 10 is used to check for deviations in grade or slope at the prepared section of the road bed before the grading equipment leaves the scene. To check the slope of the road bed, the instrument 10 is arranged across or transversely of the road bed as illustrated in FIG. 1. The designed slope for the road bed is known and it is expressed as a percentage of the width of the road bed (i.e., 3% slope, meaning that for every 100 units of width there should be a vertical difference of 3 units), and the crank arm 42 is turned until the exposed calibration at the indicator bar is set at the numeral "3." If the slope of the road bed is accurate, the cross member 16 of the instrument 10 will be horizontal when the instrument 10 is placed on the road bed, and the bubble of the spirit level 18 will be centered. It should be noted here that the pivotal connections for the foot members 22 and 36 permit the instrument 10 to rest evenly on the road bed (as seen by the dotted line position in FIG. 2) even while the cross member 16 remains in a horiaontal dispostion. If the spirit level 18 indicates that the cross member 16 is not horizontal, then it will be apparent that there is some deviation between the designed and actual slope of the road bed, and the degree of this deviation can be readily determined by turning the crank arm 42 to raise or lower the movable element 34 until the cross member 16 is properly leveled and by then checking the calibration at the indicator bar 58 to determine the variation from the designed slope.

It will be noted, however, that the accuracy of the reading obtained from the instrument 10 depends on the smoothness of the portion of the road bed on which the instrument 10 rests, and while prepared road beds generally have a uniform smoothness, it is not uncommon for such a road bed to have relatively small areas at which a depression or a crown occurs. If one of the foot members 22 or 36 of the instrument 10 should happen to rest on either a depressed or crowned area of the road bed, then the reading offered by the calibration of the instrument 10 would not properly reflect the actual slope of the road bed. However, the cord 68 of the instrument 10 provides a means whereby the possibility of such an inaccurate reading can be quickly checked. Since the ends of the cord 68 are attached to the fixed stanchion 20 and the movable element 34, respectively, at points equidistant from the supporting surfaces 22' and 36' of the foot members 22 and 36, the cord 68 provides a straight line reference which should be parallel to the surface of the road bed. Therefore, if a yardstick or similar implement is used to measure the vertical distance between the cord 68 and the surface of the road bed (indicated by the dimension "X" in FIG. 2) all along the extent of the cord 68, this vertical distance will be uniform if the road bed surface is smooth. If the road bed surface is not smooth, or if one of the foot members 22 or 36 is set at a depression or crown on the road bed surface, the dimension "X" will not be uniform along the extent of the cord 68 and it will be apparent that the road bed surface must be properly leveled before the actual slope of the road bed can be accurately determined.

To check the grade of a road bed, the instrument 10 is placed to extend along the longitudinal direction of the road bed, and the instrument 10 is utilized in the same manner as that described above.

Thus, the instrument 10 of the present invention provides a device by which the grade or slope of a road bed can be quickly and easily determined, and the cord 68 assures that such determination will be entirely accurate. Because of its simplicity of operation and its accuracy, the instrument 10 can be employed at the job side before the grading equipment is taken from the area, and any proper deviation in the slope or grade of the road bed can be corrected immediately.

It will be understood that while the instrument 10 has been particularly described herein for use in checking the slope and grade of a road bed, the instrument 10 can also be used with equal effectiveness in checking the incline of any reference surface.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An instrument for use in checking and determining grades and slopes of a surface, said device comprising a cross member carrying a spirit level and extending between a pair of stanchion members arranged in perpendicular relation to said cross member, one of said stanchion members being fixed to said cross member and the other said stanchion member including a housing fixed to said cross member and a movable element arranged for selective movement with respect to said housing in a direction substantially normal to said cross member, said one stanchion member and said movable element of said other stanchion member each having a foot member attached thereto for resting on said surface, and linear extensional means attached endwise to said one stanchion member and to said movable element of said other stanchion member, respectively, at points thereon which are equidistant from the supporting surfaces of the foot members thereof whereby said linear extensional means establishes a line between said points.

2. An instrument as defined in claim 1 and further characterized in that linear extensional means cmprises a cord extending tautly between said points.

3. An instrument as defined in claim 1 and further characterized in that said housing is tubular and telescopically receives said movable element, in that said movable element is provided with a calibrated scale along at least a portion of the length thereof, and in that said tubular housing is formed with an opening which exposes a portion of said calibrated scale whereby the extent of movement of said movable element can be determined by viewing the calibrated scale exposed by said opening.

4. An instrument as defined in claim 3 and further characterized in that said calibrated scale includes calibrated increments which are one one-hundreth of the length of said cross member.

5. An instrument as defined in claim 3 and further characterized in that tubular housing is provided with a screw element extending internally along the length thereof and being connected to a crank arm disposed at the top of said other stanchion member, and in that said movable element is tubular to receive said screw element with a threaded connection whereby turning said crank will result in movement of said movable element with respect to said tubular housing along the length thereof.

* * * * *